US012544361B2

(12) United States Patent
Bredif et al.

(10) Patent No.: US 12,544,361 B2
(45) Date of Patent: Feb. 10, 2026

(54) **COMPOSITION COMPRISING AT LEAST ONE OXAZOLINE FOR INHIBITING THE GROWTH OF *MALASSEZIA* YEASTS INVOLVED IN CRADLE CAP, IN PARTICULAR**

(71) Applicant: Laboratoires Expanscience, Paris la Defense (FR)

(72) Inventors: Stephanie Bredif, Croisilles (FR); Sophie Leclere-Bienfait, Dreux (FR); David Durancet, Saint Cyr l'Ecole (FR)

(73) Assignee: Laboratoires Expanscience, Paris la Defense (FR)

( * ) Notice: Subject to any disclaimer, the term of this patent is extended or adjusted under 35 U.S.C. 154(b) by 952 days.

(21) Appl. No.: 17/624,692

(22) PCT Filed: Jul. 13, 2020

(86) PCT No.: PCT/EP2020/069799
§ 371 (c)(1),
(2) Date: Jan. 4, 2022

(87) PCT Pub. No.: WO2021/009142
PCT Pub. Date: Jan. 21, 2021

(65) Prior Publication Data
US 2022/0249446 A1  Aug. 11, 2022

(30) Foreign Application Priority Data

Jul. 12, 2019  (FR) ..................................... 1907861

(51) Int. Cl.
| | | |
|---|---|---|
| *A61K 31/421* | (2006.01) | |
| *A61K 8/49* | (2006.01) | |
| *A61K 47/14* | (2017.01) | |
| *A61K 47/36* | (2006.01) | |
| *A61K 47/44* | (2017.01) | |
| *A61P 31/10* | (2006.01) | |
| *A61Q 5/00* | (2006.01) | |
| *A61Q 17/00* | (2006.01) | |

(52) U.S. Cl.
CPC .............. *A61K 31/421* (2013.01); *A61K 8/49* (2013.01); *A61K 47/14* (2013.01); *A61K 47/36* (2013.01); *A61K 47/44* (2013.01); *A61P 31/10* (2018.01); *A61Q 5/006* (2013.01); *A61Q 17/005* (2013.01)

(58) Field of Classification Search
CPC .. A61K 2300/00; A61K 31/22; A61K 31/421; A61K 31/715; A61K 47/14; A61K 47/36; A61K 8/37; A61K 47/44; A61K 8/49; A61K 8/63; A61K 8/678; A61K 8/73; A61K 8/922; A61K 9/0014; A61K 9/06; A61P 31/10; A61Q 17/005; A61Q 19/005; A61Q 5/006
See application file for complete search history.

(56) References Cited

U.S. PATENT DOCUMENTS

| | | | |
|---|---|---|---|
| 3,769,398 A | 10/1973 | Hewitt | |
| 4,876,249 A | 10/1989 | Rajadhyaksha | |
| 2005/0075380 A1 | 4/2005 | Msika et al. | |
| 2006/0122246 A1 | 6/2006 | Msika et al. | |
| 2009/0274637 A1 | 11/2009 | Msika et al. | |
| 2013/0183255 A1* | 7/2013 | Saunois ............... | A61Q 19/005 424/59 |
| 2015/0057269 A1 | 2/2015 | Valle et al. | |

FOREIGN PATENT DOCUMENTS

| | | |
|---|---|---|
| EP | 3061448 B1 | 7/2020 |
| FR | 2834216 A1 | 7/2003 |
| JP | 2006160623 A | 6/2006 |
| WO | 2004112741 A1 | 12/2004 |
| WO | 2006114443 A1 | 11/2006 |
| WO | 2013121449 A1 | 8/2013 |

OTHER PUBLICATIONS

Becker, Lillian C., et al. "Safety Assessment of Dialkyl Malates as Used in Cosmetics." International Journal of Toxicology, vol. 34, No. 1_suppl, Jul. 2015, pp. 5S-17S. DOI.org (Crossref), https://doi.org/10.1177/1091581815584625. (Year: 2015).*

Burnett, Christina L., et al. "Safety Assessment of Plant-Derived Fatty Acid Oils." International Journal of Toxicology, vol. 36, No. 3_ suppl, Nov. 2017, pp. 51S-129S. DOI.org (Crossref), https://doi.org/10.1177/1091581817740569. (Year: 2017).*

Bergfeld, Wilma F. et al. "Safety Assessment of Polysaccharide Gums as Used in Cosmetics." Cosmetic Ingredient Review, Oct. 2015, pp. 1-87. (Year: 2015).*

(Continued)

*Primary Examiner* — Clinton A Brooks
*Assistant Examiner* — Kyle Nottingham
(74) *Attorney, Agent, or Firm* — Rouget F. Henschel; Potomac Law Group, PLLC

(57) ABSTRACT

The present invention relates to a composition comprising at least one oxazoline, such as OX100, for inhibiting the growth of *Malassezia* yeasts and/or for preventing and/or treating conditions caused by *Malassezia* yeasts, seborrheic dermatitis, cradle cap, *Malassezia* folliculitis, dandruff, *Pityriasis versicolor* or *Pityriasis capitis*. The present invention also relates to a composition comprising at least one oxazoline such as OX100, at least one compound such as malic acid diester and a vegetable oil oleodistillate and/or arabinogalactan, and to the use of same for preventing and/or treating, in particular, affections caused by *Malassezia* yeasts, seborrheic dermatitis, cradle cap, *Malassezia* folliculitis, dandruff, *Pityriasis versicolor* or *Pityriasis capitis*.

12 Claims, No Drawings

(56) References Cited

OTHER PUBLICATIONS

International Search Report issued in application No. PCT/EP2020/069799 dated Sep. 30, 2020.
Kim et al., "Synthesis of Benzoxazole Amides as Novel Antifungal Agents against Malassezia Furfur," Bull. Korean Chem. Soc., vol. 31, No. 5, pp. 1270-1274, May 2010.
Lusskin et al., "A New Reaction of Nitriles. V. Preparation of N-(2-Halo-1-ethyl)-amides," J. Amer. Chem. Soc., vol. 72, p. 5577-5578, 1950.

* cited by examiner

COMPOSITION COMPRISING AT LEAST ONE OXAZOLINE FOR INHIBITING THE GROWTH OF *MALASSEZIA* YEASTS INVOLVED IN CRADLE CAP, IN PARTICULAR

FIELD OF THE INVENTION

The present invention relates to a composition comprising at least one oxazoline, such as OX100, for inhibiting the growth of *Malassezia* yeasts and/or for preventing and/or treating affections caused by *Malassezia* yeasts, seborrheic dermatitis such as cradle cap, *Malassezia* folliculitis, dandruff, *Pityriasis versicolor* or *Pityriasis capitis*. The present invention also relates to a composition comprising at least one oxazoline such as OX100, at least one compound such as malic acid diester and a vegetable oil oleodistillate and/or arabinogalactan, and to the use of same for preventing and/or treating, in particular, affections caused by *Malassezia* yeasts, seborrheic dermatitis, cradle cap, *Malassezia* folliculitis, dandruff, *Pityriasis versicolor* or *Pityriasis capitis*.

CONTEXT OF THE INVENTION AND PRIOR ART

The human microbiome includes multiple diverse microorganisms such as bacteria, viruses and fungi. *Malassezia* yeasts, which belong to the Basidiomycetes, are part of the human commensal flora, particularly in the scalp. These yeasts release hydrolases, such as lipases and phospholipases C, which enable the production of fatty acids from the lipids of the yeast host. In people with seborrheic dermatosis, *Malassezia* yeasts invade the stratum corneum and the free fatty acids generated by the release of lipases cause an inflammatory process. Inflammation leads to hyper-proliferation of the stratum corneum and incomplete differentiation of the corneocytes, which alters the functions of the stratum corneum, including its barrier function, resulting in easy access for *Malassezia* yeasts. *Malassezia* yeasts are involved in many skin conditions such as seborrheic dermatitis, *Malassezia* folliculitis, scalp dandruff, *Pityriasis capitis* or *Pityriasis versicolor*.

Seborrheic dermatitis is a fairly common, benign, chronic inflammatory erythematous-squamous dermatosis that evolves in flare-ups and most often affects the scalp and face, particularly the nasolabial folds and eyebrows. One of the typical forms affects infants and appears as yellow crusts on the scalp (cradle cap) or face.

Cradle cap is a form of infantile seborrheic dermatitis (ISD) with erythematous patches of oily scalp scales, the incidence of which is highest in the patients' third month of life. The factors for the appearance of cradle cap are diverse. Hyperproduction of sebum is one of these factors: it causes dead corneocytes to adhere to the skin surface and prevents their physiological desquamation. Invasion of the stratum corneum by *Malassezia* yeasts as described above is another such factor.

In the prior art, the therapeutic strategy used in the treatment of seborrheic dermatitis, in particular cradle cap, aims to regulate sebum production, calm the inflammation of the skin and reduce the development of *Malassezia* yeasts. This treatment involves the use of anti-inflammatory drugs such as dermocorticoids and antifungal drugs such as ketoconazole, lithium gluconate or ciclopirox olamine. Treatment may also involve emollients such as mineral or olive oils or petroleum jelly and keratolytics such as salicylic acid.

However, prolonged use of corticosteroids can lead to side effects such as skin atrophy, striae, telangiectasia, folliculitis, hypopigmentation and addiction, and prolonged use of antifungals can lead to side effects such as contact dermatitis; in addition, other treatments have limitations in use; for example, lithium gluconate is only indicated for the treatment of immunocompetent adults.

There is thus a genuine need for a composition for preventing and/or treating conditions caused by *Malassezia* yeasts, which is topically administrable, does not exhibit the above-mentioned adverse effects of corticosteroids and antifungals, and is suitable for use in children, infants and newborns.

In its French patent application No 01/16917, the Applicant describes the use of oxazolines, which inhibit the migration of Langerhans cells. In its international patent application WO 2004/112741, the Applicant also describes the use of composition comprising at least one oxazoline as a slimming agent. In its international patent application WO 2006/114443, the Applicant further describes the depigmenting or complexion-lightening action of a composition comprising at least one oxazoline.

U.S. Pat. No. 4,876,249, in turn, describes compositions comprising oxazolines, in which the oxazolines are promoters of the penetration of physiological active agents through the stratum corneum layer of the skin.

In the context of the present invention, the inventors have surprisingly discovered that oxazolines are capable of inhibiting the growth of microorganisms, in particular inhibiting the growth of *Malassezia* yeasts.

The Applicant has thus discovered that a composition comprising at least one oxazoline as active principle, in particular 2-undecyl-4,4-dimethyl-1,3-oxazoline, called OX100, can be used to inhibit the growth of *Malassezia* yeasts and/or to prevent and/or treat pathologies induced by a *Malassezia* yeast and/or prevent and/or treat seborrheic dermatitis and/or to prevent and/or treat cradle cap, *Malassezia* folliculitis, scalp dandruff, *Pityriasis capitis* or *Pityriasis versicolor*.

Indeed, the oxazolines according to the invention, in particular, inhibit the growth of *Malassezia* yeasts and act as an anti-inflammatory, a soothing agent and an anti-itching agent.

SUMMARY OF THE INVENTION

According to a first aspect, the present invention relates to a composition, such as a pharmaceutical, dermatological or cosmetic composition, comprising at least one oxazoline, for use in inhibiting the growth of microorganisms, in particular in inhibiting the growth of *Malassezia* yeasts. The present invention also relates to a composition, such as a pharmaceutical, dermatological or cosmetic composition, comprising at least one oxazoline, for use in the prevention and/or treatment of pathologies induced by a *Malassezia* yeast. The present invention advantageously relates to a composition, such as a pharmaceutical, dermatological or cosmetic composition, comprising at least one oxazoline, such as OX100, for use in the prevention and/or treatment of seborrheic dermatitis, in particular infantile seborrheic dermatitis such as cradle cap, *Pityriasis capitis, Malassezia* folliculitis, dandruff or *Pityriasis versicolor*.

According to a second aspect, the present invention relates to a composition comprising at least one oxazoline such as OX100; at least one ester advantageously selected from a malic acid diester, a tartaric acid diester, a lactic acid ester, a citric acid triester and a salicylic acid ester; and a vegetable oil oleodistillate and/or arabinogalactan.

The composition according to the invention may be a pharmaceutical, dermatological or cosmetic composition and may be used to prevent and/or treat, in particular, affections caused by *Malassezia* yeasts, seborrheic dermatitis, infantile seborrheic dermatitis such as cradle cap, *Pityriasis capitis*, *Malassezia* folliculitis, dandruff or *Pityriasis versicolor*.

DEFINITIONS

In the sense of the present invention, "*Malassezia* yeast" means any species and variety of yeast belonging to the genus *Malassezia*, also called genus *Pityrosporum*. For example, non-limiting mention may be made of the following yeast species: *Malassezia furfur*, in particular strain CIP 1634.86, *Malassezia globosa*, *Malassezia restricta*, *Malassezia sympodialis*, *Malassezia obtuse*, *Malassezia sloofiae*, *Malassezia pachydermatis* and *Malassezia* folliculitis.

In the sense of the present invention, "dandruff" means unsightly clusters of dead cells on the scalp.

In the sense of the present invention, "*Pityriasis versicolor*" means a skin infection caused by *Malassezia furfur*, which appears as multiple scaly patches ranging in color from white to brown to pink.

In the sense of the present invention, the term "$C_1$-$C_6$ alkoxy ($OC_1$-$C_6$)" means an alkoxy radical comprising from 1 to 6 carbon atoms.

In the sense of the present invention, MIC (minimum inhibitory concentration) means the lowest concentration of a compound that inhibits the growth of a given microorganism.

In the sense of the present invention, "*Malassezia* folliculitis", also known as *Malassezia* folliculitis, means an inflammatory skin disorder typically appearing as a pruritic, follicular papulopustular rash distributed on the upper trunk of young adults; this disease of fungal etiology may mimic acne vulgaris and is also known as *Pityrosporum* folliculitis.

In the sense of the present invention, "vegetable oil oleodistillate" means a vegetable oil which its unsaponifiable fraction has been subjected to a concentration step. The unsaponifiable fraction is the fraction of a fatty substance which remains insoluble in water after prolonged action of an alkaline base and can be extracted by an organic solvent. Methods that can be used to concentrate the unsaponifiable fraction of a vegetable oil include cold crystallization, liquid-liquid extraction and molecular distillation. In most unsaponifiable vegetable oils, the groups of substances present are: saturated or unsaturated hydrocarbons, aliphatic or terpenic alcohols, sterols, phytosterols, tocopherols, carotenoid pigments and xanthophylls.

DETAILED DESCRIPTION OF THE INVENTION

Thus, according to a first aspect, a subject matter of the present invention is a composition, typically a pharmaceutical or dermatological composition, comprising at least one oxazoline, for use in inhibiting the growth of *Malassezia* yeasts and/or for use in the prevention and/or treatment of pathologies induced by a *Malassezia* yeast.

The present invention also relates to a composition, such as a pharmaceutical, dermatological or cosmetic composition, comprising at least one oxazoline, for use in the prevention and/or treatment of seborrheic dermatitis, in particular infantile seborrheic dermatitis such as cradle cap, *Pityriasis capitis* or *Malassezia* folliculitis.

The present invention further relates to a composition, such as a pharmaceutical, dermatological or cosmetic composition, comprising at least one oxazoline, for use in the prevention and/or treatment of dandruff or *Pityriasis versicolor*.

The oxazolines according to the present invention have the following general formulas:

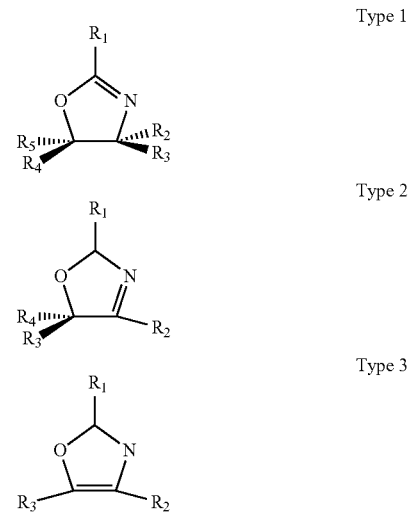

wherein $R_1$ represents a $C_1$-$C_{40}$, preferably $C_1$-$C_{20}$, more preferably $C_{10}$-$C_{15}$, even more preferably $C_{11}$-$C_{12}$, linear or branched, saturated or unsaturated alkyl group optionally comprising one or more ethylenic unsaturation(s) as well as one or more substituent(s) selected from the group formed by hydroxy (OH) and $C_1$-$C_6$ alkoxy ($OC_1$-$C_6$) radicals; $R_2$, $R_3$, $R_4$ and $R_5$ independently represent a hydrogen atom, a hydroxy radical, or a linear or branched, saturated or unsaturated $C_1$-$C_{30}$ alkyl group optionally comprising one or more ethylenic unsaturation(s) as well as one or more substituent(s) selected from the group formed by hydroxy (OH), $C_1$-$C_6$ alkoxy ($OC_1$-$C_6$) and $C_1$-$C_6$ alkoxycarbonyl ($COOC_1$-$C_6$) radicals.

According to an advantageous embodiment of the present invention, said oxazoline is a type 1 oxazoline selected from the group consisting of 2-undecyl-4-hydroxymethyl-4-methyl-1,3-oxazoline, 2-undecyl-4,4-dimethyl-1,3-oxazoline, (E)-4,4-dimethyl-2-heptadec-8-enyl-1,3-oxazoline, 4-hydroxymethyl-4-methyl-2-heptadecyl-1,3-oxazoline, (E)-4-hydroxymethyl-4-methyl-2-heptadec-8-enyl-1,3-oxazoline, 2-undecyl-4-ethyl-4-hydroxymethyl-1,3-oxazoline. Advantageously, said oxazoline is 2-undecyl-4,4-dimethyl-1,3-oxazoline, called OX100, of formula:

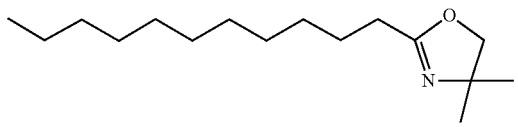 [SMILES: CCCCCCCCCCCC1=NC(C)(C)CO1]

A number of synthetic routes are known for preparing the oxazoline compounds according to the invention. For instance, these can be prepared by chemical synthesis by reacting a fatty acid (or a methyl ester) and an amino alcohol, most often in the presence of an azeotropic agent in order to promote the elimination of the water formed (and the methanol formed). Another possible synthetic route is to condense a haloamide in the presence of a strong base or sodium carbonate (R. M. Lusskin, J. Amer. Chem. Soc. 72, (1950), 5577). Oxazolines can also be synthesized by reaction of epoxides with nitriles, by reaction of thionyl chloride with hydroxyamides, or by the action of an acid on an aziridinylphosphine.

Advantageously, the present invention relates to a composition, such as a pharmaceutical, dermatological or cosmetic composition, comprising 2-undecyl-4,4-dimethyl-1,3-oxazoline, called OX100, for use in the treatment and/or prevention of scalp dandruff or *Pityriasis versicolor*.

According to an advantageous embodiment of the present invention, the composition according to the invention is characterized in that the oxazoline concentration is advantageously comprised between 0.01 and 10%, more advantageously between 0.01 and 3%, even more advantageously between 0.01 and 0.5%, even more advantageously between 0.05 and 0.2%, by weight of oxazoline, based on the total weight of the composition.

According to a particular embodiment, the composition according to the invention further comprises:
at least one vegetable oil oleodistillate, preferably an oleodistillate rich in tocopherols and/or phytosterols, even more preferentially a sunflower oil oleodistillate; and/or
arabinogalactan; and/or
at least one compound selected from a malic acid diester, a tartaric acid diester, a lactic acid ester, a citric acid triester and a salicylic acid ester, preferably a malic acid diester, even more preferably di-C12-C13-alkyl malate.

Typically, the composition according to the invention may comprise a combination of:
an oxazoline, such as 2-undecyl-4,4-dimethyl-1,3-oxazoline, called OX100; and
arabinogalactan; and
at least one compound selected from a malic acid diester, a tartaric acid diester, a lactic acid ester, a citric acid triester and a salicylic acid ester, preferably a malic acid diester, even more preferably the di-C12-C13-alkyl malate.

According to another particular embodiment, the composition according to the invention may comprise a combination of:
an oxazoline, such as 2-undecyl-4,4-dimethyl-1,3-oxazoline, called OX100; and
at least one vegetable oil oleodistillate, preferably an oleodistillate rich in tocopherols and/or phytosterols, even more preferentially a sunflower oil oleodistillate; and
at least one compound selected from a malic acid diester, a tartaric acid diester, a lactic acid ester, a citric acid triester and a salicylic acid ester, preferably a malic acid diester, even more preferably di-C12-C13-alkyl malate.

According to another advantageous embodiment, the composition according to the invention may comprise a combination of:
an oxazoline, such as 2-undecyl-4,4-dimethyl-1,3-oxazoline, called OX100; and
at least one vegetable oil oleodistillate, preferably an oleodistillate rich in tocopherols and/or phytosterols, even more preferentially a sunflower oil oleodistillate; and
arabinogalactan; and
at least one ester selected from a malic acid diester, a tartaric acid diester, a lactic acid ester, a citric acid triester and a salicylic acid ester, preferably a malic acid diester, even more preferably the di-C12-C13-alkyl malate.

Preferably the vegetable oil oleodistillate, such as sunflower oil oleodistillate, is present in an amount of 0.01% to 10%, preferably 0.5 to 5%, even more preferably 1 to 3%, by weight based on the total weight of the composition and/or the arabinogalactan is present in an amount of 0.01% to 10%, preferably from 0.5 to 5%, still more preferably from 1 to 3%, by weight, based on the total weight of the composition, and/or the ester, advantageously the malic acid diester, is present in an amount of from 0.01% to 10%, preferably from 0.5 to 5%, still more preferably from 1 to 3%, by weight, based on the total weight of the composition.

Indeed, the presence of these four types of compounds advantageously makes it possible to obtain various effects: inhibition of the growth of *Malassezia* yeasts, anti-inflammatory effect, keratolytic effect (for eliminating scales and limiting the hyperproliferation of the stratum corneum) and emollient/moisturizing effect (for gentle detachment of scales, in particular cradle cap). Such a combination of effects is thus relevant in the context of the compositions for their use according to the invention, in particular in the context of preventing and/or treating seborrheic dermatitis, in particular infantile seborrheic dermatitis such as cradle cap, since such a combination of compounds acts on the causes and the consequences of said seborrheic dermatitis.

The esters of malic acid, citric acid, lactic acid, tartaric acid and salicylic acid are used in particular for their keratolytic activities, for restoring the natural desquamation of the skin, for moisturizing and for their emollient protective activity for the skin. Thus, preferably, the esters according to the invention are derived from the condensation of an alpha- or beta-hydroxylated acid such as malic acid, citric acid, lactic acid, tartaric acid and salicylic acid, with 1 to 3 identical or different fatty alcohols of formula ROH, where R is a linear or branched, saturated or unsaturated, $C_1$-$C_{20}$, preferably $C_{10}$-$C_{15}$, preferably $C_{12}$-$C_{13}$ or $C_{14}$ or $C_{14}$-$C_{15}$, alkyl group. Preferably, these compounds are selected from di-C12-C13-alkyl malate, tri-C14-C15-alkyl citrate, C12-D13-alkyl lactate, di-C12-C13-alkyl tartrate and tridecyl salicylate. For example, these compounds may be the compounds marketed by the company Sasol under the trade names COSMACOL® EMI, COSMACOL® ECL, COSMACOL® ELI, COSMACOL® ETI and COSMACOL® ESI, respectively.

According to a preferred embodiment of the invention, a malic acid diester is used, preferably di-C12-13 alkyl malate, for example the product marketed under the name COSMACOL® EMI by the company Sasol. This is a non-fatty lipid which has the properties of being a high-purity lipophilic emollient and a keratolytic, of moisturizing the skin and of regulating sebum production.

Arabinogalactan advantageously contributes to the anti-inflammatory, soothing and anti-itching actions of the composition according to the invention, as well as to its keratolytic effect. The arabinogalactan used may be the product marketed under the name LaraCare® A200 by the company Lonza. Arabinogalactan, also known as galactoarabinan, is a natural polymer cross-linked with galactose and arabinose units in a 6:1 ratio, respectively. This polysaccharide promotes non-irritating exfoliation by alpha-hydroxy acids such as malic acid on the skin and, due to its moisturizing and non-irritating properties, it also significantly reduces insensible water loss from the skin; these combined actions promote cell renewal.

The vegetable oil oleodistillates which can be used in the context of the present invention are, in a non-limiting manner, the oleodistillates of the following oils: passionflower, lupin, sunflower, sesame, wheat germ, palm, palm kernel, coconut, grape seed, black mustard, oyster, avocado, peanut, cottonseed, olive, corn, cocoa, castor, Ben, linseed, rapeseed, shea butter, sweet almond, soybean, annatto, safflower, walnut, hazelnut, turnip, or mixtures thereof.

Advantageously, the vegetable oil oleodistillates used are selected from the oleodistillates of the following oils: sunflower, soybean, avocado, lupin, passionflower, sesame, wheat germ, or mixtures thereof.

According to a preferred embodiment, the vegetable oil oleodistillate used is rich in tocopherols and/or phytosterols. The term "rich" refers to tocopherol and phytosterol contents above the respective average contents obtained by considering all vegetable oils known to the person skilled in the art, in particular the vegetable oils cited in the present application.

According to a more preferred embodiment, the vegetable oil oleodistillate used is sunflower oleodistillate. Advantageously, sunflower oleodistillate stimulates the synthesis of certain lipids of the skin barrier and reduces the amount of inflammation mediators. It thus exerts an emollient, humectant, anti-inflammatory, soothing and anti-itching action. In the composition according to the invention, the sunflower oleodistillate used is preferably the product marketed under the name Soline® by the company Expanscience®.

The composition which makes it possible to implement the invention comprises a pharmaceutically or dermatologically or cosmetically acceptable carrier, that is to say a carrier which is compatible with the skin, and can be in all the galenic forms normally used for topical application, in particular in the form of an aqueous, hydroalcoholic or oily solution, an oil-in-water or water-in-oil or multiple emulsion, an aqueous or oily gel, a liquid anhydrous product, a dispersion of oil in an aqueous phase with the aid of spherules, these spherules which can be polymeric nanoparticles such as nanospheres and nanocapsules or, better, ionic or non-ionic lipid vesicles, a transdermal device or in any other form for topical application.

This composition may be substantially fluid and have the appearance of a white or colored cream, an ointment, a milk, a lotion, a serum, a paste, a mousse, a gel, a shampoo or a conditioner.

Advantageously, the pharmaceutically or dermatologically or cosmetically acceptable medium is a cream.

The composition according to the invention may also contain the usual adjuvants in the pharmaceutical or dermatological or cosmetic fields, such as hydrophilic or lipophilic gelling agents, hydrophilic or lipophilic active agents, thickeners, preservatives, antioxidants, solvents, fragrances, chelating agents, odor absorbers, chemical or mineral filters, mineral pigments, surfactants, polymers, silicone oils and dyestuffs. The amounts of these various adjuvants are those conventionally used in the fields considered, for example from 0.01 to 20% of the total weight of the composition. These adjuvants, depending on their nature, may be introduced into the fat phase, into the aqueous phase, into the lipid vesicles or into the nanoparticles.

When the composition of the invention is an emulsion, the proportion of the fat phase may range from 5 to 80% by weight, preferably from 5 to 50% of the total weight of the composition. The oils, emulsifiers and co-emulsifiers used in the composition in emulsion form are selected from those conventionally used in the field considered. The emulsifier and the co-emulsifier are present in the composition in a proportion ranging from 0.3 to 30% by weight, preferably from 0.5 to 20% of the total weight of the composition.

As oils which can be used in the compositions for implementing the invention, mention may be made of mineral oils, oils of vegetable origin (apricot oil, sunflower oil, plum oil), oils of animal origin, synthetic oils, silicone oils and fluorinated oils (perfluoropolyethers). Fatty alcohols (cetyl alcohol), fatty acids, waxes (beeswax) can also be used as fats.

As emulsifiers and co-emulsifiers which can be used in the invention, mention may be made of polyethylene glycol fatty acid esters such as PEG-40 stearate, PEG-100 stearate, polyol fatty acid esters such as glyceryl stearate and sorbitan tristearate.

Hydrophilic gelling agents include carboxyvinyl (carbomer) polymers, acrylic copolymers such as acrylate/alkylacrylate copolymers, polyacrylamides, polysaccharides, natural gums and clays, and lipophilic gelling agents include modified clays such as bentones, metal salts of fatty acids, hydrophobic silica and polyethylenes.

The optimal modes of administration, dosages and galenic forms of the compounds and compositions according to the invention can be determined according to the criteria generally taken into account in establishing a pharmaceutical or dermatological or cosmetic treatment adapted to a patient, such as, for example, the extent of the area of skin to be treated, the tolerance to the treatment and the type of skin.

The invention also relates to the use of a cosmetic, dermatological or pharmaceutical composition as described above to inhibit the growth of *Malassezia* yeasts and/or to prevent and/or treat pathologies induced by a *Malassezia* yeast and/or to prevent and/or treat seborrheic dermatitis and/or to prevent and/or treat cradle cap, *Malassezia* folliculitis, *Pityriasis capitis*, scalp dandruff or *Pityriasis versicolor*.

According to an embodiment, the invention relates to the cosmetic use of the composition as described above, to prevent and/or treat scalp dandruff or *Pityriasis versicolor*, advantageously to prevent and/or treat scalp dandruff.

The invention also relates to a method for inhibiting the growth of *Malassezia* yeasts and/or for preventing and/or treating pathologies induced by a *Malassezia* yeast and/or for preventing and/or treating seborrheic dermatitis and/or for preventing and/or treating cradle cap, *Malassezia* folliculitis, *Pityriasis capitis*, scalp dandruff or *Pityriasis versicolor*, comprising administering to a patient in need thereof an effective amount of a cosmetic, dermatological or pharmaceutical composition as previously described.

Another subject matter of the invention is the use of a composition as described above for the manufacture of a pharmaceutical, dermatological or cosmetic composition intended to inhibit the growth of *Malassezia* yeasts and/or to prevent and/or treat pathologies induced by a *Malassezia* yeast and/or to prevent and/or treat seborrheic dermatitis and/or to prevent and/or treat cradle cap, *Malassezia* folliculitis, *Pityriasis capitis*, scalp dandruff or *Pityriasis versicolor*.

According to a second aspect, the present invention relates to a composition, such as a pharmaceutical, dermatological or cosmetic composition, characterized in that it comprises:
at least one oxazoline such as OX100;
at least one compound selected from a malic acid diester, a tartaric acid diester, a lactic acid ester, a citric acid triester and a salicylic acid ester, preferably a malic acid diester, more preferably di-C12-C13-alkyl malate; and either a vegetable oil oleodistillate, preferably an oleodistillate rich in tocopherols and/or phytosterols, even more preferentially a sunflower oil oleodistillate, or arabinogalactan, or a mixture of these two compounds.

According to a preferred embodiment, the oxazoline is present in an amount of 0.01% to 10%, preferably 0.01 to 3%, even more advantageously 0.01 to 0.5%, even more advantageously 0.05 to 0.2%, by weight of oxazoline based on the total weight of the composition, the optional sunflower oleodistillate is present in an amount of 0.01% to 10%, preferably 0.5 to 5%, even more advantageously 1.0% to 3%, by weight based on the total weight of the composition, the optional arabinogalactan is present in an amount of 0.01% to 10%, preferably 0.5 to 5%, even more preferably 1 to 3%, by weight based on the total weight of the composition, and the malic acid diester is present in an amount of 0.01% to 10%, preferably 0.5 to 5%, even more preferably 1 to 3%, by weight based on the total weight of the composition. The invention also relates to a composition according to the second aspect of the invention, for use in inhibiting the growth of *Malassezia* yeasts and/or for use in the prevention and/or treatment of pathologies induced by a *Malassezia* yeast, in particular for use in the prevention and/or treatment of seborrheic dermatitis, cradle cap, *Malassezia* folliculitis, *Pityriasis capitis*, dandruff or *Pityriasis versicolor*.

Advantageously, the composition according to the present invention can be prepared by the preparation process comprising the following steps:

adding at least one oxazoline, preferably the molecule OX100, a malic acid diester, and either a sunflower oil oleodistillate or arabinogalactan; and mixing the composition obtained.

The following examples are intended to illustrate the present invention in a non-limiting manner.

EXAMPLES

Example 1: Determination of the MIC in Solid Medium of *Malassezia furfur* Against the Cycloceramide OX100

Protocol: the minimum inhibitory concentration (MIC) of a strain of *Malassezia furfur* (CIP 1634.86) against cycloceramide OX100 is determined in solid medium by agar dilution method according to COURVALIN P., GOLDSTEIN F., PHILIPPON A. and SIROT J.-Fiche technique 5—L'antibiogramme, édition MPC, 1985, p. 199.

Result: The result obtained is MIC=64 µg/mL.

Example 2: Determination of the MIC in Liquid Medium of *Malassezia furfur* Against the Cycloceramide OX100

Protocol

The determination of the minimum inhibitory concentration of cycloceramide OX100 is carried out by a procedure adapted to liquid media in 96-well plates. The MIC study is conducted using GLYcoDiag technology, using the microbial strain *Malassezia furfur* (American Type Culture Collection (ATCC) reference 14521) as the organism. The cultures are reconstituted according to the instructions of the collection center supplying the reference strain.

Preparation of samples and test microorganisms: OX100 cycloceramide is diluted in culture medium to the following concentrations: final concentrations in culture medium (expressed as percentages by volume): 0.25%; 0.125%; 0.0625%; 0.0312%; 0.01562%; 0.0078%.

Analytical controls are prepared and used identically to the sample:

a control corresponding to the microbiological medium alone;

a control consisting of Phenoxyethanol® prepared at 5% (v/v) directly in the microbiological medium associated with each microbial strain.

In order to determine the MIC of cycloceramide OX100, it is tested in serial dilutions of 6 dilutions directly in the culture medium intended to support the growth of the *M. furfur* strain (96-well microplates). Then, each dilution point is contaminated with the test strain in an amount of about $5.20 \cdot 10^4$ cfu/mL per well. Finally, the tests are incubated for 48 hours at 32.5° C. 2.5° C., taking care to respect the respiratory type of the strain which is facultative aero-anaerobic.

Results

At the end of the 48-hour incubation period, the presence or absence of a cloudiness reveals the state of microbial growth. The last dilution corresponding to the absence of growth of *M. furfur* is retained as minimum inhibitory concentration (MIC). The results of the study are that the product OX100 shows antimicrobial activity with an MIC of 0.031% (v/v) for the strain *M. furfur*.

Example 3: Action of Arabinogalactan and Malic Acid Diester on *Malassezia* Yeasts: Determination of their Respective MICs in Liquid Medium on a Strain of *Malassezia furfur*

Protocol

The minimum inhibitory concentration (MIC) of arabinogalactan and malic acid diester is carried out using a procedure adapted to liquid media in 96-well plates. The MIC study is conducted using GLYcoDiag technology, using the microbial strain *Malassezia furfur* (American Type Culture Collection (ATCC) reference 14521) as the organism. The cultures are reconstituted according to the instructions of the collection center supplying the reference strain.

Preparation of samples and test microorganisms: the products are diluted in culture medium at the concentrations defined in the table below.

TABLE 1

| Molecule contained in the sample | Final concentration in culture medium (% (v/v)) |
|---|---|
| Arabinogalactan | 5; 2.5; 1.25; 0.625; 0.3125; 0.15625 |
| Malic acid diester | 5; 2.5; 1.25; 0.625; 0.3125; 0.15625 |

Analytical controls are prepared and used identically to the sample:

a control corresponding to the microbiological medium alone; and a control consisting of Phenoxyethanol® prepared at 5% (v/v) directly in the microbiological medium associated with each microbial strain.

In order to determine the MIC of the product, it is tested in serial dilutions of 6 dilutions directly in the culture medium intended to promote the growth of the *M. furfur* strain (96-well microplates). Then, each dilution point is contaminated with the test strain in an amount of about $1.30 \cdot 10^4$ cfu/mL per well. Finally, the tests are incubated for 48 hours at 32.5° C.±2.5° C., taking care to respect the respiratory type of the strain which is facultative aero-anaerobic.

Results

At the end of the 48-hour incubation period, the presence or absence of a cloudiness reveals the state of microbial growth. The last dilution corresponding to the absence of growth of *M. furfur* is retained as minimum inhibitory concentration (MIC). The results of the study are that arabinogalactan shows antimicrobial activity with an MIC of 2.5% for the *M. furfur* strain, and malic acid diester shows antimicrobial activity with an MIC of 1.25% (v/v) for the *M. furfur* strain.

Example 4: Example of a Composition According to the Invention

TABLE 2

| Ingredients | % weight/weight |
| --- | --- |
| Purified water | QS 100% |
| Glycerol | 1-10% |
| Actigum ™ VSX20 | 0-1% |
| Octanediol | 0-1% |
| Hydrolite ® 6 | 0-2% |
| Sodium Benzoate | 0-1% |
| Citric acid | 0-1% |
| Potassium cetyl phosphate | 0-5% |
| Pure cetyl alcohol | 0-5% |
| Propanediol dicaprylate | 1-10% |
| Caprylocaprate glyc | 5-20% |
| Alpha-tocopherol | 0-1% |
| Cyloceramide (OX100) | 0.01-10% |
| B4 helianthe ST (Sunflower oil distillate) | 0.01-10% |
| Alcohol di-malate SR(Cosmacol ® EMI-Diester of malic acid) | 0.01-10% |
| LaraCare ® A200 (Arabinogalactan) | 0.01-10% |
| Avocado polyphenols | 0-5% |

QS = quantity sufficient

Example 5: Clinical Study: Confirmation in Human Volunteers of the Acceptability and Compatibility of the Composition According to Example 4 after Application Under Normal Conditions of Use, Subjective Evaluation of its Cosmetic Qualities and its Efficacy; Use Test Under Dermatological and Pediatric Controls The study was carried out on 60 babies aged between 2 days and 35 months (12 are between 0 and 28 days old, 48 are between 1 month and 3 years old) with cradle cap (without atopic dermatitis on the scalp and the rest of the body). Twenty-eight (28) subjects were female (46.7%) and 32 were male (53.3%).

Methods of use: the composition according to Example 4 is used daily until the symptoms disappear completely; the recommendations are to apply the composition to the cradle caps every day and to leave it on overnight.

Conduct of the Study:
D0: inclusion of subjects and clinical examination by the examiners, clinical scoring and delivery of the test product
D1-D20: application of the product and daily tolerance feedback from the user
D21: final clinical examination and global assessment of the examiners, clinical scoring, global assessment of the examiner, self-evaluation and global assessment of the user Summary of Results:
After 20 days of use, the product has shown an efficiency on cradle cap with a reduction of scales, seborrhea, redness and irritation.
1. Assessment of tolerance between D1 and D20 (n=60)
    Repeated application of the composition under normal conditions of use does not induce skin reactions. The product is therefore very compatible and acceptable to the skin.
2. Clinical scoring D21/D0 (n=60)
    Statistically significant decrease of about 80% in surface area and size of scales, thickness of scales, seborrhea, erythema/irritation.
    Statistically significant decrease of about 85% in overall severity.
    Statistically significant decrease of about 90% in the percentage of total lesion area.
3. Questionnaire at D21 (n=60)
    The responses are deemed significant if the percentage of favorable responses is greater than or equal to 60%.
    Reviewer's overall assessment: the product is significantly evaluated as having: sebum-regulating efficacy, kerato-regulating efficacy, cleansing efficacy, efficacy against redness, satisfactory efficacy in the treatment of cradle cap and contributes to restoring the balance of the scalp.
    User self-assessment:
    The cradle cap disappeared in 75% of the subjects (45 volunteers). In these 45 subjects, the cradle caps disappeared on average after 7.73 (±4.87) days of application of the product and did not reappear for 97.8% of them.
    In addition, the product is significantly assessed as having the following features, belonging to the categories efficacy, cosmetic qualities, ease of use and overall assessment.
    Effectiveness: the product quickly and effectively eliminates cradle cap, helps to loosen cradle cap, promotes the elimination of scales, reduces the oily aspect of the scalp (sebum production), reduces redness, soothes the scalp, moisturizes the scalp, reduces feelings of discomfort and respects the weakened scalp Cosmetic qualities: the texture of the product is soft and light, the product does not stick, the product is well tolerated, the neutral smell is pleasant.
    Pleasant to use: the product is easy to apply and spreads well, your child reacts favorably to the application, the removal of cradle cap is easy without rubbing, the product is easily removed, the product does not stain sheets or clothes, the product is pleasant to use. Overall assessment: the product is better than the product I usually use, it is a product that you would gladly buy; overall the product is satisfactory.

The invention claimed is:

1. A method for inhibiting the growth of *Malassezia* yeasts in a patient in need thereof, wherein said patient has a pathology induced by a *Malassezia* yeast, comprising the administration of an effective amount of a composition comprising an oxazoline to said patient, wherein the composition further comprises:
    at least one vegetable oil oleodistillate, wherein the at least one vegetable oil oleodistillate is a sunflower oil oleodistillate;
    arabinogalactan; and
    at least one ester selected from a malic acid diester, a tartaric acid diester, a lactic acid ester, a citric acid triester and a salicylic acid ester,
    wherein the oxazoline is 2-undecyl-4,4-dimethyl-1,3-oxazoline (OX100) of the following formula A:

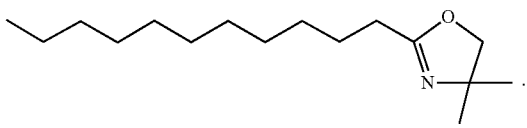

2. The method as claimed in claim 1, wherein the pathology is cradle cap or *Malassezia* folliculitis.

3. The method as claimed in claim 1, for treating wherein the pathology is dandruff, seborrheic dermatitis, *pityriasis capitis*, or *pityriasis versicolor*.

4. The method as claimed in claim 1, wherein said composition comprises between 0.01% and 10% by weight of oxazoline based on the total weight of the composition.

5. The method as claimed in claim 1, wherein the oleodistillate is present in an amount of 0.01% to 10% by weight, and/or the arabinogalactan is present in an amount of from 0.01% to 10% by weight, and/or the ester is present in an amount of from 0.01% to 10% by weight, based on the total weight of the composition.

6. The method as claimed in claim 1, wherein the at least one ester is di-C12-C13-alkyl malate.

7. The method as claimed in claim 1, wherein said composition comprises between 0.01% and 3% by weight of oxazoline based on the total weight of the composition.

8. The method as claimed in claim 1, wherein the oleodistillate is present in an amount of 0.5% to 5% by weight based on the total weight of the composition.

9. The method as claimed in claim 1, wherein the arabinogalactan is present in an amount of from 0.5% to 5% by weight based on the total weight of the composition.

10. The method as claimed in claim 1, wherein the ester is present in an amount of from 0.5% to 5% by weight, based on the total weight of the composition.

11. The method as claimed in claim 1, wherein said composition is substantially free of corticosteroids, antifungals, and lithium gluconate.

12. The method as claimed in claim 1, wherein said method does not cause said patient to exhibit adverse effects of corticosteroids and antifungals.

* * * * *